T. P. EUSTEGE.
CLUTCH FOR CONTROLLING AND GRIPPING ROPES.
APPLICATION FILED MAY 1, 1916.

1,194,980.

Patented Aug. 15, 1916.
2 SHEETS—SHEET 1.

Inventor.
Thomas Peter Eustege.

By: H van Oldemmel

ATTORNEY.

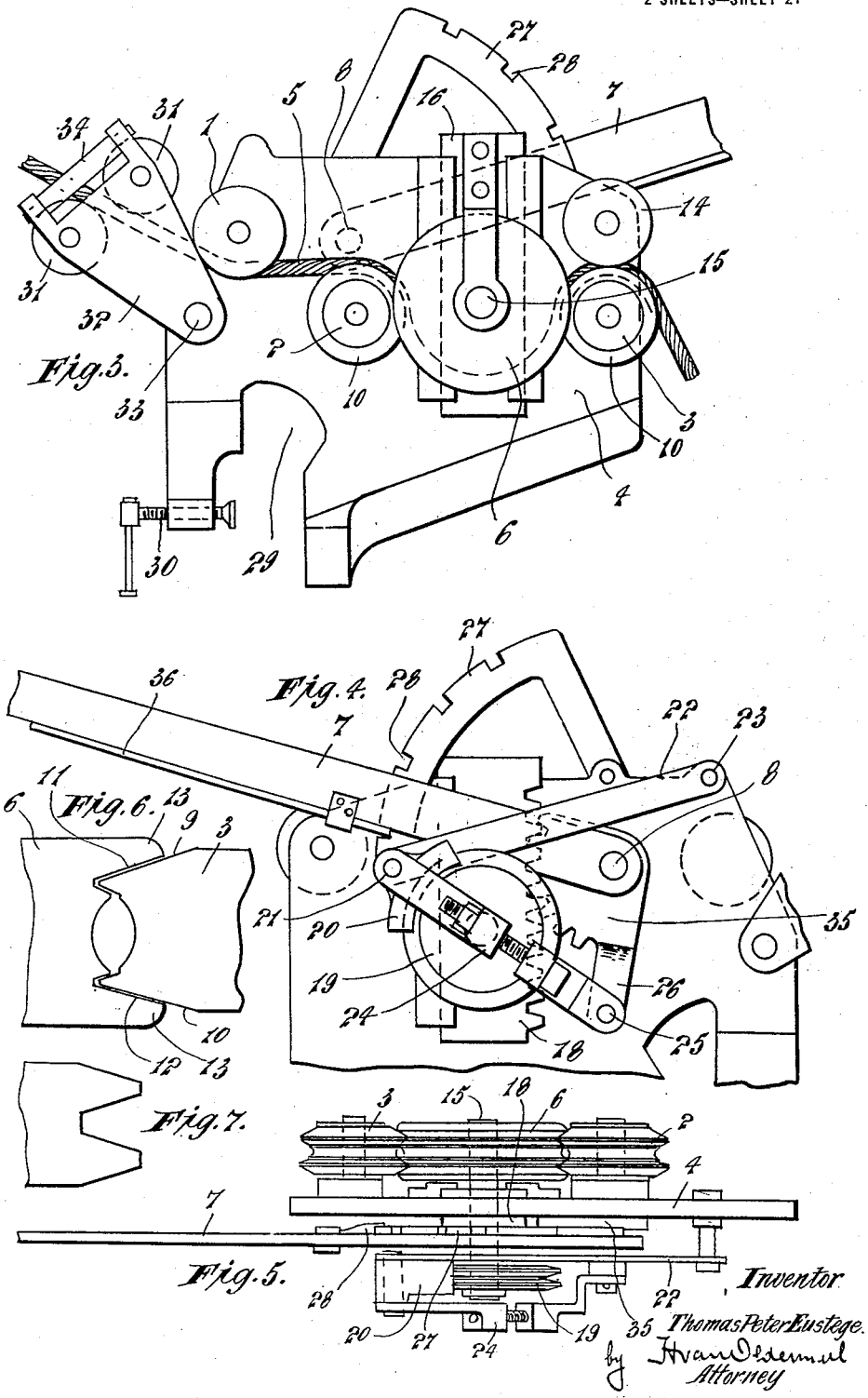

UNITED STATES PATENT OFFICE.

THOMAS PETER EUSTEGE, OF WELLINGTON, NEW ZEALAND, ASSIGNOR OF ONE-HALF TO JONATHAN JONES, OF WELLINGTON, NEW ZEALAND.

CLUTCH FOR CONTROLLING AND GRIPPING ROPES.

1,194,980.  Specification of Letters Patent.  Patented Aug. 15, 1916.

Application filed May 1, 1916. Serial No. 94,800.

*To all whom it may concern:*

Be it known that I, THOMAS PETER EUSTEGE, a subject of the King of Great Britain and Ireland, and residing at Hohiria Road, Hataitai, Wellington, in the Dominion of New Zealand, have invented a new and useful Improvement in Clutches for Controlling and Gripping Ropes; and I do hereby declare the following to be a full, clear, and exact description of the same.

This invention provides an improved clutch for gripping, holding and controlling ropes and the like which pass through sheaves or pulleys.

The object of the invention is to make a rope-clutch that will obviate friction to the rope and at the same time allow the rope to travel through the clutch rapidly, or if desired to put sufficient tension or grip on the rope to let it out at a required speed and further to grip and hold the rope in such a manner as to stop the travel altogether.

According hereto one or more rope-pulleys, sheaves or rollers are journaled in a frame or other suitable structure. In conjunction with these pulleys or the like there may be another pulley or pulleys, but placed over the first set of pulleys. Means are provided whereby a rope is threaded between the pulleys and the hauling force of the rope instead of making the rope to slip is used to turn the various pulleys or the like. One or more of the pulleys is made movable and operated by a lever provided with suitable operating means. By means of such lever and operating means the movable pulley may be so adjusted as to increase the hug upon the rope and the rope may thereby be squeezed against another pulley or pulleys with any desired degree of pressure. Mounted on the same spindle as the movable pulley there may be a brake pulley which is provided with a brake operated by suitable means. The rope is led past guide rollers which guide it as it is pulled in different directions.

The invention will be illustrated in the accompanying drawings and the novel features indicated more clearly in the claims.

Figure 1:
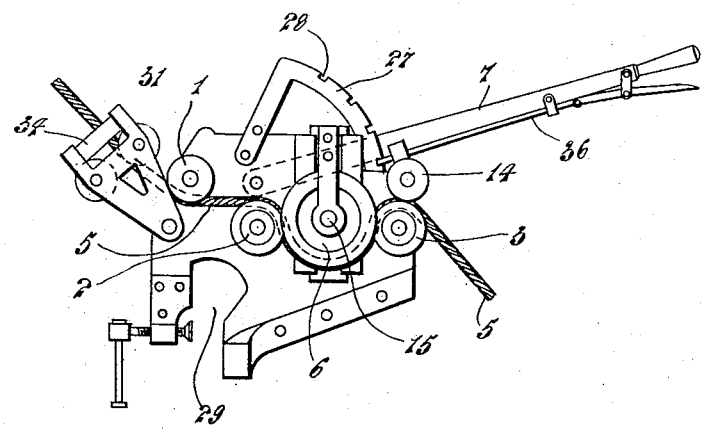
Figure 2:
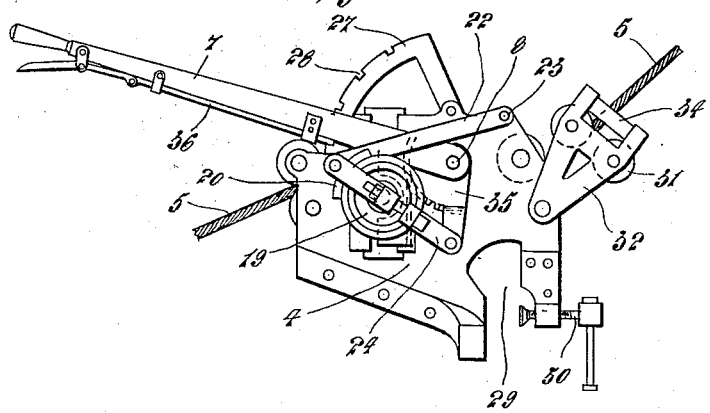

Referring now to the drawings, Figure 1 shows the essential features of one side of the machine. Fig. 2 shows an elevation of the obverse side of the machine. Fig. 3 is a side elevation, drawn to a larger scale, of the pulleys situated upon the machine. Fig. 4 is an elevation drawn to the same scale as Fig. 3 and showing the obverse side of the machine. Fig. 5 is a plan projected from Fig. 4. Fig. 6 is a sectional view of the brake surfaces on the pulleys. Fig. 7 is a section upon the rim of the brake pulley.

Referring to the drawings pulleys 2 and 3 are mounted upon a frame 4 and over these pulleys the rope 5 the speed of which is to be controlled, passes. Located between the pulleys 2 and 3 is a pulley 6 capable of vertical movement by the operation of the lever 7 which is pivoted at 8. The rope 5 passes below the pulley 6. The rims of the pulleys 2, 3, and 6 are provided with brake surfaces preferably of the form shown in Fig. 6, in which is shown the pulley 3 having external brake surfaces 9 and 10 and the pulley 6 having corresponding internal brake surfaces 11 and 12 formed upon flanges 13.

Pulleys 1 and 14 are provided in the machine shown and simply act as guide pulleys. The pulley 6 is fixed upon a pin 15 journaled in a bracket 16 guided in plates 17 fixed to the frame, said bracket 16 having teeth 18 formed thereon in which the teeth of a quadrant rack 35 engages.

The quadrant rack is pivoted upon a pin 8 and is operable by the lever 7 to which it is fixed. By means of this arrangement the pulley 6 may be operated in a vertical direction. The rope 5 passes along the grooves of the pulley and by lowering the pulley 6 toward and between the pulleys 2 and 3 the hug on the rope entails the expenditure of energy. This energy is taken from the rope as it travels and thereby retards the speed of the rope. When it is desired to still further retard the travel the pulley 6 is lowered until the brake surfaces 11 and 12 come in contact with the brake surfaces of the pulleys 2 and 3. In order to stop the rope altogether a brake pulley 19 is provided upon the pin 15 and operable by the lever 7 with the pulley 6. A brake block 20 is pivoted by a pin 21 to a link 22 pivoted at 23 and also to an adjustable link 24 which is pivoted by a pin 25 to the tail 26 of the quadrant rack 19.

It will be seen that as the lever 7 and the pulley 6 are raised the tail 26 of the quadrant rack will cause the brake block to travel upward in a radial direction, thus preventing the block 20 from bearing against the brake surface of the brake pulley 19.

When, however, it is desired to stop the travel of the rope the lever 7 is pressed downwardly and when the position shown in Fig. 4 is reached, any further downward pressure causes the brake block 20 to bear tightly against the rim of the brake pulley 19 thus stopping the pulley 6. Since the brake surfaces of the pulley 6 will at that position be in contact with the brake surfaces of the pulleys 2 and 3 and the grooves of these pulleys bearing hard upon the rope, the rope will be caused to stop in its travel. A quadrant 27 is fixed to the frame and having notches 28 into which the end of a rod 36 engages. The pulley 6 is thereby enabled to be retained in a desired position.

The machine shown in the drawings is adapted to be employed upon the hatch of a boat, wharf or such like fixture, and for that purpose has a suitably shaped jaw 29 and a threaded pin 30 for retaining the machine rigidly in position. The rope may be suitably guided to the pulley 1 by any desired arrangement, the machine shown having pulleys 31 pivoted in a bracket 32 pivoted upon a pin 33 in the frame 4. Lateral pulleys 34 are also pivoted in an extension of the bracket 32 which pulleys in conjunction with the pulleys 31 guide the rope to the pulley 1.

What I claim is:—

1. An improved clutch for controlling and gripping ropes and the like wherein a rope passes around pulleys, a movable pulley or pulleys engaging with said first pulleys whereby the hug upon the rope is increased or diminished in order to control the travel of the rope, substantially as set forth.

2. An improved clutch for controlling and gripping ropes and the like, characterized by pulleys having brake surfaces upon their peripheries and so arranged that the respective brake surfaces may be brought into contact in order to diminish the speed and to grip the rope, substantially as set forth.

3. An improved clutch for controlling and gripping ropes characterized by one set of grooved pulleys having brake surfaces, a movable pulley or pulleys having brake surfaces and so arranged as to move toward the first set of pulleys in order to increase the hug on the rope and to bring the brake surface or surfaces thereof into contact with the brake surfaces of the first set of pulleys, substantially as set forth.

4. An improved clutch for controlling and gripping ropes comprising grooved pulleys having brake surfaces, a grooved pulley having a brake surfaced upon its periphery adapted to engage the brake surfaces upon the first two pulleys and operable toward said pulleys, a brake wheel movable with said pulleys, a brake block adapted to engage with said brake wheel when said grooved pulley is in its lowest position, and means for operating the said pulley and brake wheel, substantially as set forth.

5. In a clutch of the kind described, pulleys pivoted upon the frame of the machine having internal brake surfaces arranged circumferentially upon their peripheries and a movable pulley or pulleys having an external corresponding brake surface arranged circumferentially upon the periphery thereof and adapted to engage the brake surface on the first mentioned brake pulleys, substantially as set forth.

6. In a clutch for controlling and gripping ropes of the kind described, pulleys pivoted upon the frame of the machine, a movable pulley or pulleys coöperating with said first pulleys whereby the hug upon the rope is increased or diminished, said movable pulley or pulleys adapted to be operated vertically between the first pulleys, substantially as set forth.

7. In a clutch of the kind described, pulleys pivoted upon the frame of the machine having internal brake surfaces arranged circumferentially upon their peripheries and a movable pulley or pulleys having an external corresponding brake surface arranged circumferentially upon the periphery thereof and adapted to engage the brake surface on the first mentioned brake pulleys, said movable pulley or pulleys adapted to be operated vertically between the first pulleys, substantially as set forth.

8. An improved clutch for controlling and gripping ropes comprising grooved pulleys having brake surfaces, a grooved pulley having a brake surface upon its periphery adapted to engage the brake surfaces upon the first two pulleys and operable toward said pulleys, a brake wheel movable with said pulleys, a brake block adapted to engage with said brake wheel when said grooved pulley is in its lowest position, said movable pulley mounted in a bracket, a toothed quadrant engaging teeth in said bracket, a lever fixed to said quadrant, a link pivoted to said quadrant and to the brake block whereby the said brake block may be moved in an upward direction upon upward operation of the lever but will bear tightly upon the brake wheel upon the downward pressure of the lever at its lowest position, substantially as set forth.

In testimony whereof, I have signed my name to this specification in the presence of two subscribing witnesses.

THOS. PETER EUSTEGE.

Witnesses:
SYDNEY H. HIGGS,
NORA MUIR.